(12) United States Patent
Tsai

(10) Patent No.: US 8,736,722 B2
(45) Date of Patent: May 27, 2014

(54) ENHANCED IMAGE CAPTURE SHARPENING

(75) Inventor: Richard Tsai, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 361 days.

(21) Appl. No.: 12/837,196

(22) Filed: Jul. 15, 2010

(65) Prior Publication Data

US 2012/0013775 A1    Jan. 19, 2012

(51) Int. Cl.
*H04N 5/208* (2006.01)
*H04N 9/64* (2006.01)
*H04N 17/00* (2006.01)
*G06K 9/40* (2006.01)

(52) U.S. Cl.
USPC ........... 348/252; 348/187; 348/251; 348/335; 382/274; 382/275

(58) Field of Classification Search
USPC .............. 348/251, 252, 222.1, 335, 187, 188; 382/266, 274, 275
See application file for complete search history.

(56) References Cited

U.S. PATENT DOCUMENTS

| | | | |
|---|---|---|---|
| 4,945,502 A | 7/1990 | Kwon et al. | |
| 5,854,859 A | 12/1998 | Sobol | |
| 6,603,885 B1 * | 8/2003 | Enomoto | 382/263 |
| 6,728,003 B1 | 4/2004 | Gallagher et al. | |
| 6,954,549 B2 | 10/2005 | Kraft | |
| 7,103,228 B2 | 9/2006 | Kraft et al. | |
| 7,538,806 B2 | 5/2009 | Kawakami et al. | |
| 8,102,445 B2 * | 1/2012 | Kanemitsu et al. | 348/251 |
| 2007/0036456 A1 * | 2/2007 | Hooper | 382/274 |
| 2008/0088857 A1 | 4/2008 | Zimmer et al. | |
| 2008/0158377 A1 * | 7/2008 | Chanas et al. | 348/222.1 |
| 2009/0213250 A1 * | 8/2009 | Alakarhu et al. | 348/243 |
| 2010/0013966 A1 | 1/2010 | Feng et al. | |
| 2010/0208095 A1 * | 8/2010 | Sugimori | 348/222.1 |

* cited by examiner

*Primary Examiner* — Nhan T Tran
(74) *Attorney, Agent, or Firm* — Blakely, Sokoloff, Taylor & Zafman LLP

(57) ABSTRACT

An image capture sharpening subsystem for a digital camera includes a capture sharpening processor and a memory that stores values for a capture sharpening amount. The values for the capture sharpening amount are a function of position on an image sensor of the digital camera. The capture sharpening processor receives a first value for a pixel in an image captured by the image sensor and a position value for the pixel on the image sensor. The capture sharpening processor determines a pixel sharpening amount from the values for the capture sharpening amount stored in the first memory according to the position value. The capture sharpening processor applies a capture sharpening process to the pixel to provide a second value for the pixel according to the pixel sharpening amount and stores the second value in a second memory that provides a sharpened version of the image captured by the image sensor.

15 Claims, 3 Drawing Sheets

ENHANCED IMAGE CAPTURE SHARPENING

BACKGROUND

1. Field

Embodiments of the invention relate to the field of digital cameras; and more specifically, to processing captured images to increase apparent sharpness.

2. Background

A camera captures an image by recording the light reflected from a subject. A camera may use an electronic image sensor, such as a charge coupled device (CCD) or complementary metal oxide semiconductor (CMOS) sensor, to record images. The electronic image sensor converts light that falls on area of the sensor into an electrical charge that is proportional to the amount of light received. The electronic image sensor may include a large number of separated areas arranged in a pattern over the image sensor. The areas represent pixels of an image.

A lens focuses an optical image on the electronic image sensor. The electronic image sensor converts the light from the optical image into a pattern of charges on the image sensor. These charges may be read in the form of electrical signals that can be converted into digital representations of the light intensity for each pixel of the image sensor. The lens will not produce an image that is as sharp as the objects being photographed. For example, a sharp white to black edge in the object will have some area of gray between the white and black in the image created by the lens.

The Modulation Transfer Function (MTF) describes the resolution and performance of an optical system. MTF is the ratio of relative image contrast divided by relative object contrast (MTF=Relative Image Contrast/Relative Object Contrast). When an object (illuminated target or reticle) is observed with an optical system, the resulting image will be somewhat degraded due to inevitable aberrations and diffraction phenomena. A real lens will not fully conform with the design data. Manufacturing errors, assembly and alignment errors in the optics will further deteriorate the overall imaging performance of the system. As a result, in the image, bright highlights will not appear as bright as they do in the object, and dark or shadowed areas will not be as black as those observed in the original patterns, particularly at edges where there are rapid changes in brightness of the image. The basic terms and mathematical relations used for MTF are described in the ISO 9334 standard.

A digital camera captures a raw file, which is a record of the data captured by the sensor. A typical digital camera uses a "mosaic" or "color filter array" (CFA) sensor. Color filter array sensors use a two-dimensional area array to collect the photons that are recorded in the image. The array is made up of rows and columns of photosensitive detectors—typically using either CCD (charge-coupled device) or CMOS (complementary metal oxide semiconductor) technology—to form the image. In a typical setup, each element of the array contributes one pixel to the final image. The sensors count photons—they produce a charge that's directly proportional to the amount of light that strikes them. Raw files from color filter array sensors are grayscale.

The color filter array creates color images from the raw grayscale capture. Each element in the array is covered by a color filter, so that each element captures only red, green, or blue light. Many sensors apply the filters in a Bayer pattern where every other filter is green, in a checkerboard pattern, and the remaining filters are red and green on alternating rows as described in U.S. Pat. No. 3,971,065. Other filter patterns are possible. Regardless of the color filter arrangement, each element in the sensor captures only one color. The grayscale raw capture is converted into a color image by demosaicing. The "missing" color information for each pixel is interpolated from its neighbors to provide full color pixels with red, green, and blue values. The demosaicing process creates an additional reduction of the MTF of the image capture beyond the MTF of the lens optics.

A blur filter is generally placed over the sensor to reduce aliasing artifacts and moiré patterns due to image details that repeat with a frequency near or greater than the grid frequency of the sensor pixels. This will reduce the MTF of the image capture still further.

Image processing that provides a sharpening effect is applied to the raw file to increase the apparent sharpness of the captured image made available to the user of the digital camera. This is intended to mask the slight blurring effects of lens, filter, and sensor design and is termed "capture" sharpening. This generally involves increasing the contrast of edges in the image which viewers perceive as sharpness. However, excessive sharpening produces a halo effect that looks unnatural and degrades the image. Therefore it is important to apply only as much sharpening as is needed to create apparent sharpness.

SUMMARY

An image capture sharpening subsystem for a digital camera includes a capture sharpening processor and a memory that stores values for a capture sharpening amount. The values for the capture sharpening amount are a function of position on an image sensor of the digital camera. The capture sharpening processor receives a first value for a pixel in an image captured by the image sensor and a position value for the pixel on the image sensor. The capture sharpening processor determines a pixel sharpening amount from the values for the capture sharpening amount stored in the first memory according to the position value. The capture sharpening processor applies a capture sharpening process to the pixel to provide a second value for the pixel according to the pixel sharpening amount and stores the second value in a second memory that provides a sharpened version of the image captured by the image sensor.

Other features and advantages of the present invention will be apparent from the accompanying drawings and from the detailed description that follows below.

BRIEF DESCRIPTION OF THE DRAWINGS

The invention may best be understood by referring to the following description and accompanying drawings that are used to illustrate embodiments of the invention by way of example and not limitation. In the drawings, in which like reference numerals indicate similar elements.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

Figure 1:
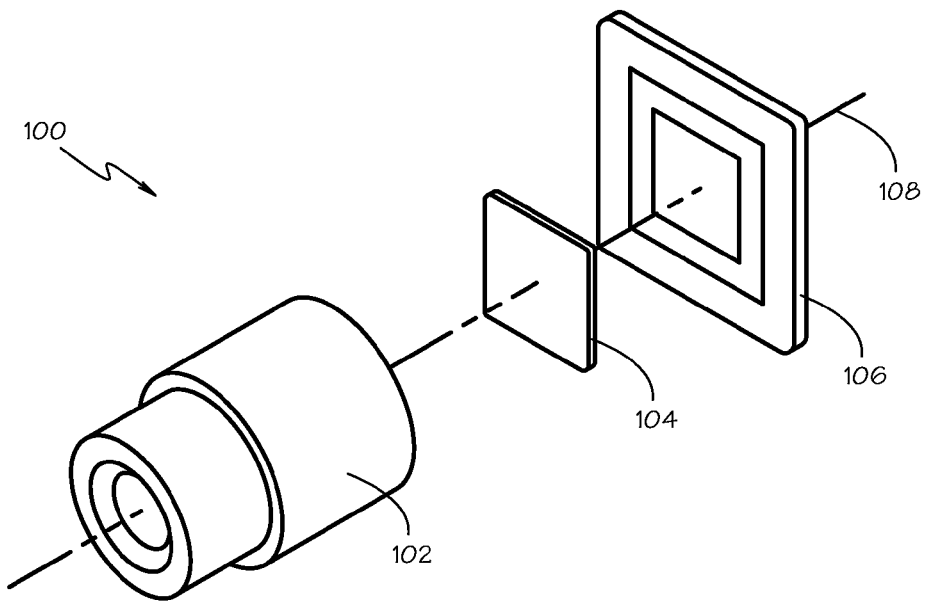
FIG. 1 is a simplified block diagram of a device to capture a digital image.

FIG. 1 is a simplified block diagram of a device 100 to capture a digital image. The device may be a digital camera or a mobile multifunction device such as a cellular telephone, a personal digital assistant, or a mobile entertainment device. Many aspects of the device, such as power supply, visual display, strobe light, autofocus and zoom mechanisms, and other aspects that are not immediately relevant to the instant invention have been omitted to avoid obscuring the relevant aspects of the device.

The device 100 includes an image sensor 106 on which an optical image is formed by a lens 102. The image sensor 106 collects electrical signals during an integration time and provides the electrical signals to an image processor as a representation of the optical image formed by the light falling on the image sensor. An analog front end (AFE) may process the electrical signals provided by the image sensor 106 before they are provided to the image processor. In the embodiment shown, a blur filter 104 is placed over the image sensor 106 to reduce aliasing artifacts and moiré patterns due to image details that repeat with a frequency near or greater than the grid frequency of the image sensor pixels. While the blur filter 104 is shown spaced apart from the image sensor 106 for clarity of illustration, it will generally be placed in close proximity to the image sensor. The optical components of the device 100—including the lens 102, the blur filter 104, and the image sensor 106—are assembled substantially centered on an optical axis 108, which is the axis of symmetry for the formation of an image by the optical components.

Figure 2:
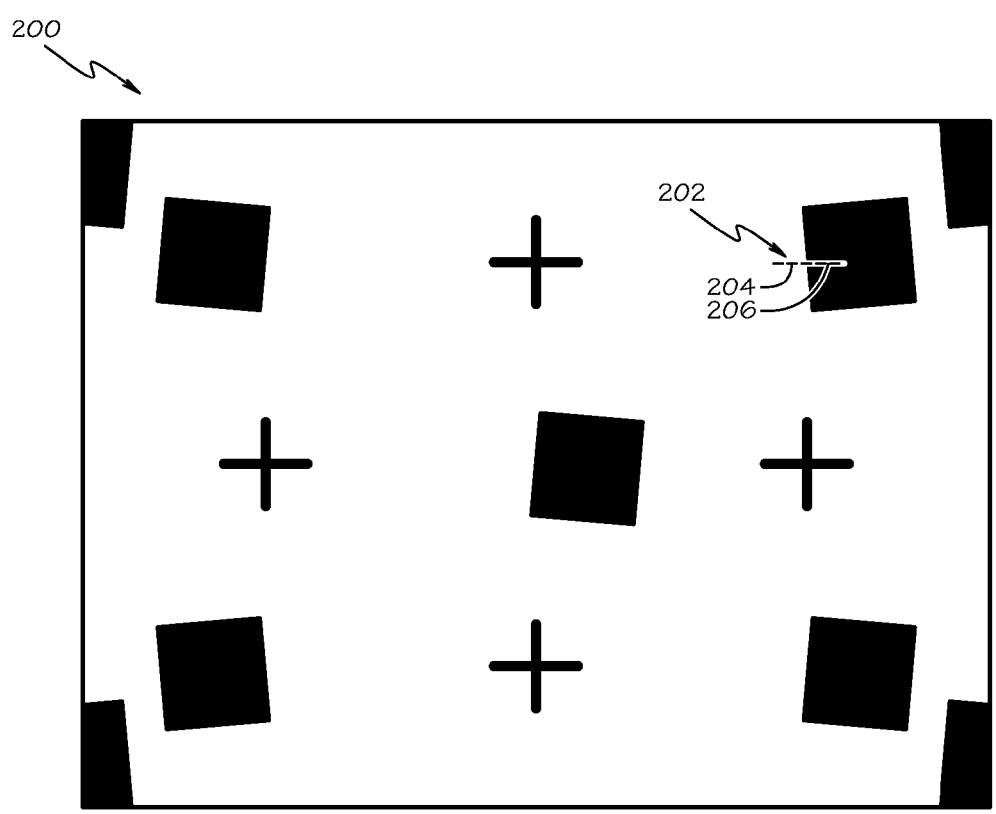
FIG. 2 is an exemplary test chart that can be used to characterize the performance of an optical system.

FIG. 2 is an exemplary test chart 200 that can be used to characterize the performance of an optical system. A measure of the modulation transfer function (MTF) for each device can be calculated using the test chart 200 (e.g., as percentage versus line pairs per mm, in accordance with ISO 12233 standard and slant edge analysis). A typical optical system will provide a sharper image (a higher MTF value) near the optical axis and a less sharp image (a lower MTF value) near the corners of the image. Manufacturing variations can cause the MTF to vary between the corners and may cause the highest MTF to be found displaced from the center of the image sensor. Embodiments of the invention use measurements of the MTF that are calculated using the test chart 200 during manufacture of individual camera devices 100 and then stored in each device.

Figure 3:
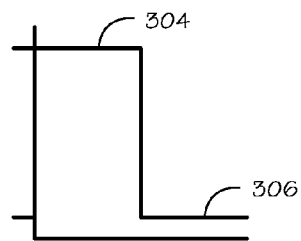
FIG. 3 is a representation of the brightness along a line on the test chart that crosses a light to dark edge of the test pattern.

FIG. 3 is a representation of the brightness along a line 202 on the test chart 200 that crosses a light to dark edge of the test pattern. (The line 202 shown in the figure is for purposes of explanation and would not be part of the test chart.) The light portion 204 of the chart is represented by a first, typically higher, value 304 and the dark portion 206 of the chart is represented by a second, typically lower, value 306.

Figure 4:
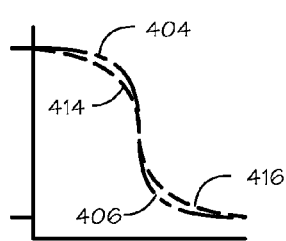
FIG. 4 is a representation of the brightness along a lines on the test chart at different distances from the optical axis as captured by the device of FIG. 1.

FIG. 4 is a representation of the brightness along the line 202 on the test chart 200 as captured by the device 100. A suggested by the figure, the sharp transition of the test chart 200 is softened in the captured image. Further, the transition between light 404 and dark 406 captured near the optical axis 108 may be sharper than the transition between light 414 and dark 416 captured near the corners of the image sensor 106.

An image can be manipulated to increase the apparent sharpness of the image. Increasing the contrast of the image in the areas where there a rapid transitions in the pixel values will make the image appear sharper.

Figure 5:
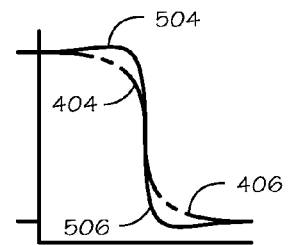
FIG. 5 illustrates the effect of the application of a first sharpening process to the portion of the image closest to the optical axis.

FIG. 5 illustrates the effect of the application of a sharpening process. The dashed curve 404, 406 represents the brightness of the transition between light 404 and dark 406 captured near the optical axis of the device 100 as discussed above. The solid line 504, 506 represents the values from the dashed curve 404, 406 after being modified by the sharpening process.

One exemplary sharpening process can be represented by this convolution matrix:

$$\begin{bmatrix} -1 & -1 & -1 \\ -1 & 9 & -1 \\ -1 & -1 & -1 \end{bmatrix}$$

The image can be represented as a matrix of pixel values. The convolution matrix is applied to each pixel in the image matrix by multiplying the pixel by the central value of the convolution matrix, 9 in the exemplary convolution matrix above. Each of the adjacent eight pixels in the image matrix is multiplied by the corresponding eight values of the convolution matrix, −1 in the exemplary convolution matrix above. These nine products are added together to provide the value for a sharpened pixel in the image. The result is to lighten pixels where the average value of the surrounding pixels is lighter than the pixel and to darken pixels where the average value of the surrounding pixels is darker than the pixel, thus enhancing the contrast of transitions in brightness.

The above exemplary convolution matrix can be generalized to the following convolution matrix:

$$\begin{bmatrix} -s/8 & -s/8 & -s/8 \\ -s/8 & 1+s & -s/8 \\ -s/8 & -s/8 & -s/8 \end{bmatrix}$$

When s=8, the above exemplary convolution matrix results. Larger values of s can be used to provide more contrast enhancement and smaller values for less.

Figure 6:
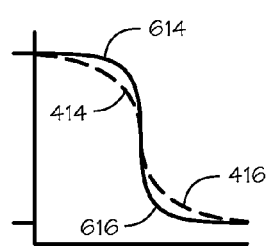
FIG. 6 illustrates the effect of the application of the first sharpening process to the portion of the image furthest from the optical axis.

FIG. 6 illustrates the effect of the application of the sharpening process illustrated in FIG. 5 when applied to the transition between light 414 and dark 416 captured near the corners of the image sensor 106 as discussed above. The solid line 614, 616 represents the values from the dashed curve 414, 416 after being modified by the same sharpening process as applied to the transition between light 404 and dark 406 captured near the optical axis as illustrated in FIG. 5. It will be seen that the modified image transition still exhibits some softness because of the greater softness of the image in this region.

Embodiments of the invention provide a memory that stores values for a capture sharpening amount. The values for the capture sharpening amount are a function of position on the image sensor 106 of the digital camera 100. The values for the capture sharpening amount are preferably determined during the manufacturing process so that variations in manufacturing that affect sharpness are reflected in the values for the capture sharpening amount. While a sharpening process using a 3×3 convolution matrix has been described as an example of a sharpening process, any sharpening process that provides a changeable parameter to control the amount of sharpening can be used with the present invention.

Figure 7:
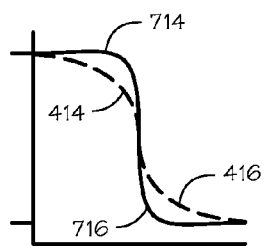
FIG. 7 illustrates the effect of the application of a second sharpening process to the portion of the image furthest from the optical axis.

FIG. 7 illustrates the effect of the application of the sharpening process applied to the transition between light 414 and dark 416 captured near the corners of the image sensor 106 with a value for the capture sharpening amount that provides a greater contrast enhancement than the sharpening process illustrated by FIGS. 5 and 6. It will be seen that the modified image transition 714, 716 is almost as sharp as the sharpened transition 504, 506 captured near the optical axis of the device 100 illustrated in FIG. 5 despite the greater softness of the image captured near the corners of the image sensor 106.

Figure 8:
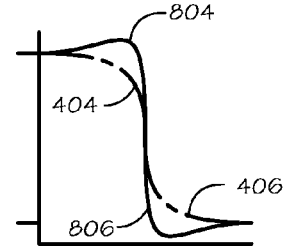
FIG. 8 illustrates the effect of the application of the second sharpening process to the portion of the image closest to the optical axis.

FIG. 8 illustrates the effect of the application of the sharpening process applied to the transition between light 404 and dark 406 captured near the optical axis of the device 100 with the same value for the capture sharpening used near the corners as illustrated in FIG. 7. It will be seen that the modified image transition 804, 806 is over-sharpened. Over-sharpening may produce undesirable visible "haloes" around the sharpened transitions as suggested by the extreme light and dark excursions at the transition that are lighter and darker than the adjacent light and dark areas that are not immediately adjacent the transition.

Figure 9:
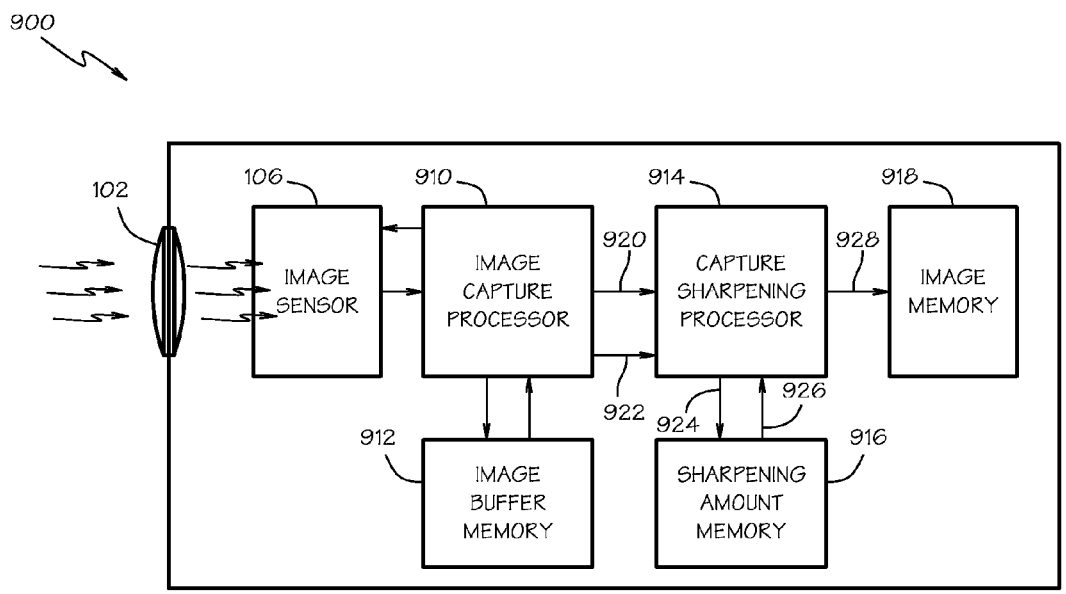
FIG. 9 is a block diagram of an exemplary digital camera system that includes an embodiment of the invention.

FIG. 9 is a block diagram of an exemplary digital camera system 900 that includes an embodiment of the invention. The digital camera system 900 may be part of a mobile multifunction device that provides additional functions such as a cellular telephone, a personal digital assistant, or a mobile entertainment device. As discussed above in connection with FIG. 1, the digital camera system 900 includes an image sensor 106 on which an optical image is formed by a lens 102. The image sensor 106 collects electrical signals during an integration time and provides the electrical signals to an image capture processor 910 as a representation of the optical image formed by the light falling on the image sensor. The image capture processor 910 may perform functions such as conversion of analog electrical values that represent the brightness of image pixels to digital numeric values and demosaicing to interpolate color values to provide full color pixel values. The image capture processor 910 may store the digital values that represent the captured image as an array of values in an image buffer memory 912.

A capture sharpening processor 914 applies a sharpening process to the digital values that represent the captured image created by the image capture processor 910. The capture sharpening processor 914 receives values 920 for pixels in an image captured by the image sensor 106 as processed by the image capture processor 910 and position information 922 for the pixel. In the embodiment illustrated, the image capture processor 910 provides both the pixel values and the related position information to the capture sharpening processor 914.

In another embodiment, the capture sharpening processor retrieves pixel values from the image capture processor by requests in which the capture sharpening processor provides the position information to the image capture processor.

The capture sharpening processor 914 further receives values 926 for a capture sharpening amount from a sharpening amount memory 916 according to the position information 924. The capture sharpening amount values are preferably stored in the sharpening amount memory 916 during the manufacturing process based on calibration of the optical subsystem. In one embodiment, the sharpening amount memory 916 provides a pixel sharpening amount for the sharpening amount to be used in the sharpening process applied by the capture sharpening processor 914 for every pixel position on the image sensor 106. In another embodiment, the sharpening amount memory 916 provides a value for the sharpening amount at selected positions on the image sensor 106 and the capture sharpening processor 914 derives a pixel sharpening amount to be used for the sharpening amount for a given pixel, such as by interpolation between the provided capture sharpening amount values.

In some embodiments, the pixel sharpening amount may further depend on variable parameters of the lens 102 such as focal distance, aperture size, and/or focal length. In one embodiment, the sharpening amount memory 916 stores values for the capture sharpening amount for various values of the lens parameters and the capture sharpening processor 914 derives a pixel sharpening amount to be used for the sharpening amount for a given pixel by interpolation between the provided capture sharpening amount values. In another embodiment, the capture sharpening processor 914 derives a pixel sharpening amount to be used for the sharpening amount by applying an adjustment to the pixel sharpening amount determined according to the position information.

Once the capture sharpening processor 914 determines a value for the pixel sharpening amount, the capture sharpening processor applies a capture sharpening process to the pixel to provide a second value for the pixel according to the pixel sharpening amount and stores the second value 928 in an image memory 918 that provides a sharpened version of the image captured by the image sensor 106. The image memory 918 may be a fixed or a removable memory or it may include both fixed and removable portions.

There may be additional image processing processes, such as image compression, that are not illustrated to avoid obscuring aspects of the present invention. The functions of the image capture processor 910 and the capture sharpening processor 914 may be performed by the same device, which may be a programmable device that executes instructions stored in a read-only memory to perform some or all of the functions provided by the image capture processor and the capture sharpening processor. The capture sharpening processor 914 may include a number of operation units to perform some or all of the functions provided by the capture sharpening processor.

Figure 10:
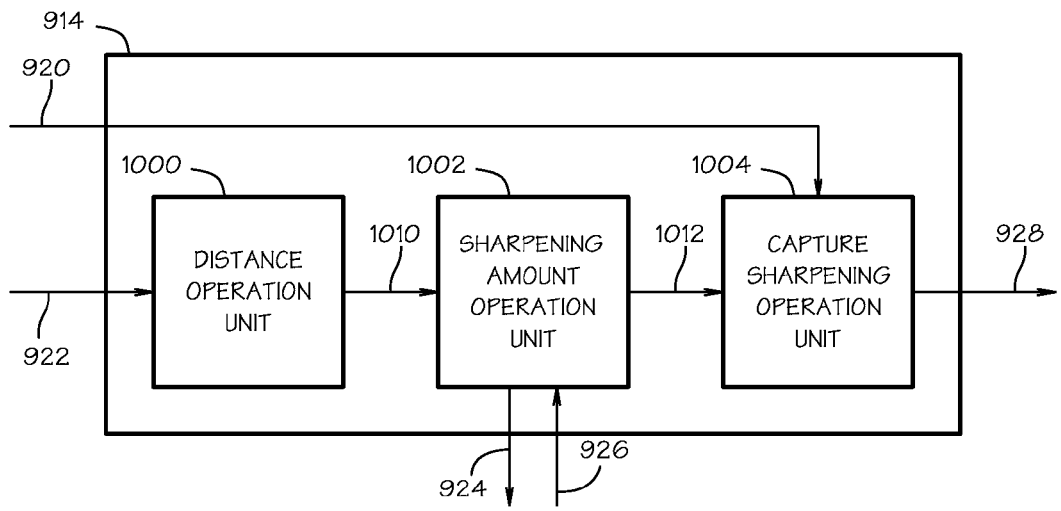
FIG. 10 is a block diagram of an exemplary capture sharpening processor.

FIG. 10 is a block diagram of an exemplary capture sharpening processor 914 that includes operation units to perform some of the functions provided by the capture sharpening processor. A distance operation unit 1000 receives position information 922 for pixels in an image captured by the image sensor. The distance operation unit 1000 obtains distance values 1010 indicating the distance from an optical-axis position to the pixel in the image data.

A sharpening amount operation unit 1002 obtains a capture sharpening amount value 1012 for the pixel by reference to an approximation function that indicates a relation between capture sharpening amount values and distance values 1010 obtained by the distance operation unit. The sharpening amount operation unit 1002 may use a table lookup that provides an input value 924 related to the distance values 1010 to a lookup table that provides an output value 926 used by the sharpening amount operation unit to obtain the capture sharpening amount value 1012.

The sharpening amount operation unit 1002 may obtain the capture sharpening amount value for the pixel by further reference to a focal distance of a lens that forms an image on the image sensor to reflect changes in the MTF characteristics of the lens as it is focused to different distances. The sharpening amount operation unit 1002 may obtain the capture sharpening amount value for the pixel by further reference to an aperture size value for a lens that forms an image on the image sensor to reflect changes in the MTF characteristics of the lens as the aperture is adjusted to allow more or less light to strike the image sensor. The sharpening amount operation unit 1002 may obtain the capture sharpening amount value for the pixel by further reference to a focal length value for a lens that forms an image on the image sensor to reflect changes in the MTF characteristics of the lens as it is "zoomed" to different focal lengths.

The approximation function used by the sharpening amount operation unit 1002 may be divided into a plurality of segments. Each segment may be represented by a quadratic function. The quadratic functions may each be defined by a predetermined number of sample points. The sharpening amount operation unit 1002 may obtain data regarding the sample points for one of the segments to which the distance value belongs. The sharpening amount operation unit 1002 may then obtain the capture sharpening amount value in accordance with one of the quadratic functions that is defined by those sample points.

A capture sharpening operation unit 1004 corrects a pixel value 920 of the pixel based on the capture sharpening amount value 1012 obtained by the sharpening amount operation unit 1002 for the pixel. The sharpened pixel value 928 may be stored as a captured image, transferred to another device, such as a printer, or provided to operation units that perform further processing of the pixel values, such as image compression.

Figure 11:
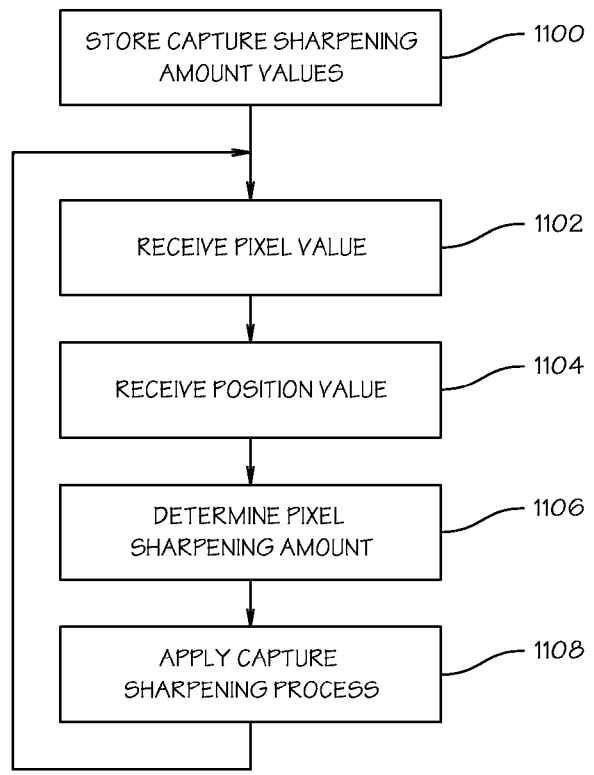
FIG. 11 is a flowchart of a method for sharpening image data captured by a camera with a capture sharpening processor.

FIG. 11 is a flowchart of a method for sharpening image data captured by a camera with a capture sharpening processor. Values for a capture sharpening amount are stored in a memory 1100, such as a write once memory that is written during a manufacturing process. The values for the capture sharpening amount are a function of a position on an image sensor that captures the image.

The capture sharpening processor receives a first value for a pixel 1102 in the image captured by the image sensor and an associated position value 1104 for the pixel on the image sensor. The capture sharpening processor determines a pixel sharpening amount 1106 from the stored values for the capture sharpening amount according to the position value.

In one embodiment, the stored values for the capture sharpening amount are for selected positions on the image sensor. The capture sharpening processor determines the pixel sharpening amount by interpolating between the stored values for the capture sharpening amount.

In another embodiment, the stored values for the capture sharpening amount is a function of the position on the image sensor and of a focal distance of a lens that forms the image on the image sensor. In this embodiment the capture sharpening processor determines a pixel sharpening amount from the stored values for the capture sharpening amount according to the position value and the focal distance.

In yet another embodiment, the stored values for the capture sharpening amount is a function of the position on the image sensor and of an aperture size of a lens that forms the image on the image sensor. In this embodiment the capture sharpening processor determines a pixel sharpening amount from the stored values for the capture sharpening amount according to the position value and the aperture size.

In still another embodiment, the stored values for the capture sharpening amount is a function of the position on the image sensor and of a focal length of a variable focal length lens that forms the image on the image sensor. In this embodiment the capture sharpening processor determines a pixel sharpening amount from the stored values for the capture sharpening amount according to the position value and the focal length.

It will be appreciated that other embodiments the stored values for the capture sharpening amount may be a function of more than two parameters. For example, the capture sharpening amount may be a function of position value, focal distance, aperture size, and focal length.

The capture sharpening processor applies a capture sharpening process 1108 to the pixel to provide a second value for the pixel according to the pixel sharpening amount to provide a sharpened version of the image captured by the image sensor. The capture sharpening process may be any of a variety processes that increases the apparent sharpness of an image by a controllable amount such that the capture sharpening processor can increase the apparent sharpness of the image by different amounts in different areas of the image. The process is repeated to process all the pixels in the captured image.

While certain exemplary embodiments have been described and shown in the accompanying drawings, it is to be understood that such embodiments are merely illustrative of and not restrictive on the broad invention, and that this invention is not limited to the specific constructions and arrangements shown and described, since various other modifications may occur to those of ordinary skill in the art. The description is thus to be regarded as illustrative instead of limiting.

What is claimed is:

1. An image capture sharpening subsystem of a digital camera, the image capture sharpening subsystem comprising:
    a first memory that stores values for a capture sharpening amount, the values for the capture sharpening amount based on calibration of an optical subsystem of the digital camera during a manufacturing process and being a function of position on a surface of an image sensor of the digital camera that captures an image;
    a capture sharpening processor
        receives a first value for a pixel in the image captured by the image sensor, the first value being associated with a position of the pixel on the surface of the image sensor,
        determines a pixel sharpening amount from the values for the capture sharpening amount stored in the first memory according to the position of the pixel on the surface of the image sensor,
        applies a capture sharpening process to the first value for the pixel to provide a second value for the pixel according to the pixel sharpening amount, the capture sharpening process enhancing contrast of transitions in brightness, and
        stores the second value in a second memory that provides a sharpened version of the image captured by the image sensor.

2. The image capture sharpening subsystem of claim 1 wherein the values for the capture sharpening amount are further a function of a focal distance of a lens that forms the image on the surface of the image sensor and the capture sharpening processor further receives a focal distance value for the lens and further determines the pixel sharpening amount according to the focal distance value.

3. The image capture sharpening subsystem of claim 1 wherein the values for the capture sharpening amount are further a function of an aperture size of a lens that forms the image on the surface of the image sensor and the capture sharpening processor further receives an aperture size value for the lens and further determines the pixel sharpening amount according to the aperture size value.

4. The image capture sharpening subsystem of claim 1 wherein the values for the capture sharpening amount are further a function of a focal length of a variable focal length lens that forms the image on the surface of the image sensor and the capture sharpening processor further receives a focal length value for the lens and further determines the pixel sharpening amount according to the focal length value.

5. The image capture sharpening subsystem of claim 1 wherein the first memory stores values for the capture sharpening amount for selected positions on the surface of the image sensor and the capture sharpening processor further determines the pixel sharpening amount by interpolating between the stored values for the capture sharpening amount.

6. A method for sharpening an image captured by a digital camera using a capture sharpening processor included in the digital camera, the method comprising:
   calibrating an optical subsystem of the digital camera during a manufacturing process to obtain values for a capture sharpening amount as a function of position on a surface of an image sensor of the digital camera;
   storing the values for the capture sharpening amount;
   receiving a first value for a pixel in the image captured by the image sensor with the capture sharpening processor and an associated position value that indicates position for the pixel on the surface of the image sensor;
   determining a pixel sharpening amount from the values for the capture sharpening amount according to the position value for the pixel on the surface of the image sensor with the capture sharpening processor; and
   applying a capture sharpening process to the first value for the pixel with the capture sharpening processor to provide a second value for the pixel according to the pixel sharpening amount to provide a sharpened version of the image captured by the image sensor, the capture sharpening process enhancing contrast of transitions in brightness.

7. The method of claim 6 wherein the values for the capture sharpening amount are further a function of a focal distance of a lens that forms the image on the surface of the image sensor, and the method further comprises receiving a focal distance value for the lens and determining the pixel sharpening amount according to the focal distance value with the capture sharpening processor.

8. The method of claim 6 wherein the values for the capture sharpening amount are further a function of an aperture size of a lens that forms the image on the surface of the image sensor, and the method further comprises receiving an aperture size value for the lens and determining the pixel sharpening amount according to the aperture size value with the capture sharpening processor.

9. The method of claim 6 wherein the values for the capture sharpening amount are further a function of a focal length of a variable focal length lens that forms the image on the surface of the image sensor, and the method further comprises receiving a focal length value for the lens and determining the pixel sharpening amount according to the focal length value with the capture sharpening processor.

10. The method of claim 6 wherein the stored values for the capture sharpening amount are for selected positions on the surface of the image sensor, and the method further comprises determining the pixel sharpening amount by interpolating between the stored values for the capture sharpening amount with the capture sharpening processor.

11. A system for sharpening image data captured by an image sensor of a digital camera, the system comprising:
   a memory that is written during a manufacturing process of the digital camera to store capture sharpening amount values based on calibration of an optical subsystem of the digital camera during the manufacturing process;
   a distance operation unit for obtaining distance values indicating the distance, along a surface of the image sensor, from an optical-axis position to a position of a pixel in the image data;
   a sharpening amount operation unit for obtaining a pixel sharpening amount value for the pixel by reference to an approximation function that indicates a relation between the capture sharpening amount values and distance values obtained by the distance operation unit; and
   a capture sharpening unit for correcting a pixel value of the pixel based on the pixel sharpening amount value obtained by the sharpening amount operation unit to enhance contrast of transitions in brightness.

12. The system of claim 11 wherein the sharpening amount operation unit obtains the pixel sharpening amount value for the pixel by further reference to a focal distance of a lens that forms an image on the surface of the image sensor.

13. The system of claim 11 wherein the sharpening amount operation unit obtains the pixel sharpening amount value for the pixel by further reference to an aperture size value for a lens that forms an image on the surface of the image sensor.

14. The system of claim 11 wherein the sharpening amount operation unit obtains the pixel sharpening amount value for the pixel by further reference to a focal length value for a lens that forms an image on the surface of the image sensor.

15. The system of claim 11 wherein the approximation function is divided into a plurality of segments, and represented by quadratic functions in the respective segments, the quadratic functions each being defined by a predetermined number of sample points on the surface of the image sensor, the sharpening amount operation unit further for obtaining data regarding the sample points for one of the segments to which the distance value belongs, and obtaining the pixel sharpening amount value in accordance with one of the quadratic functions that is defined by those sample points.

* * * * *